Nov. 3, 1931.  G. F. SCHODDE  1,830,680

BRAKE TESTER

Filed Aug. 21, 1928

INVENTOR
George F. Schodde
BY
William R. Coley
ATTORNEY

Patented Nov. 3, 1931

1,830,680

UNITED STATES PATENT OFFICE

GEORGE F. SCHODDE, OF PITTSBURGH, PENNSYLVANIA

BRAKE TESTER

Application filed August 21, 1928. Serial No. 301,039.

My invention relates to brake-testing apparatus, or the like, and it has special relation to apparatus for testing the usual band brakes of automobiles, for example.

One object of my invention is to provide brake-testing apparatus comprising a structure adapted to turn with a portion of the brake, together with an indicating device for engaging a part of the structure under certain conditions to indicate the force required to slip the brake when set.

The second object of my invention is to provide an apparatus of the above-indicated character wherein an indication of the force required to slip the brake when set may be secured in either direction of operation.

Another object of my invention is to provide brake-testing apparatus comprising a structure adapted to peripherally and adjustably engage a wheel, together with an indicating device loosely mounted on the structure and adapted to engage one or more portions thereof to indicate the force required to slip the brake when set, such indications being available for either one or both directions of operation.

A further object of my invention is to provide a brake-testing apparatus of the class in question wherein a plurality of plunger members are adapted for mutually exclusive operation by different portions of a base structure adapted to adjustably engage the periphery of a wheel.

Another object of my invention is to provide brake-testing apparatus comprising an indicating device having a movable pressure member and adapted to receive a manual-pressure-applying member, together with a structure that is adapted to turn with a portion of the brake for exerting pressure against the pressure member.

More specifically stated, this object of my invention is to provide a wheel-brake-testing apparatus comprising an indicating device having a plurality of oppositely disposed plungers and also a plurality of oppositely disposed sockets for respectively receiving a handle member, together with a base structure having a plurality of projections for exerting pressure against the one or the other plunger when the handle member is actuated in the one or the other direction.

My invention may be best understood by reference to the accompanying drawings, wherein Figure 1 is a view, in elevation, with parts broken away, of a portion of an automobile equipped with my present invention.

Figure 1:
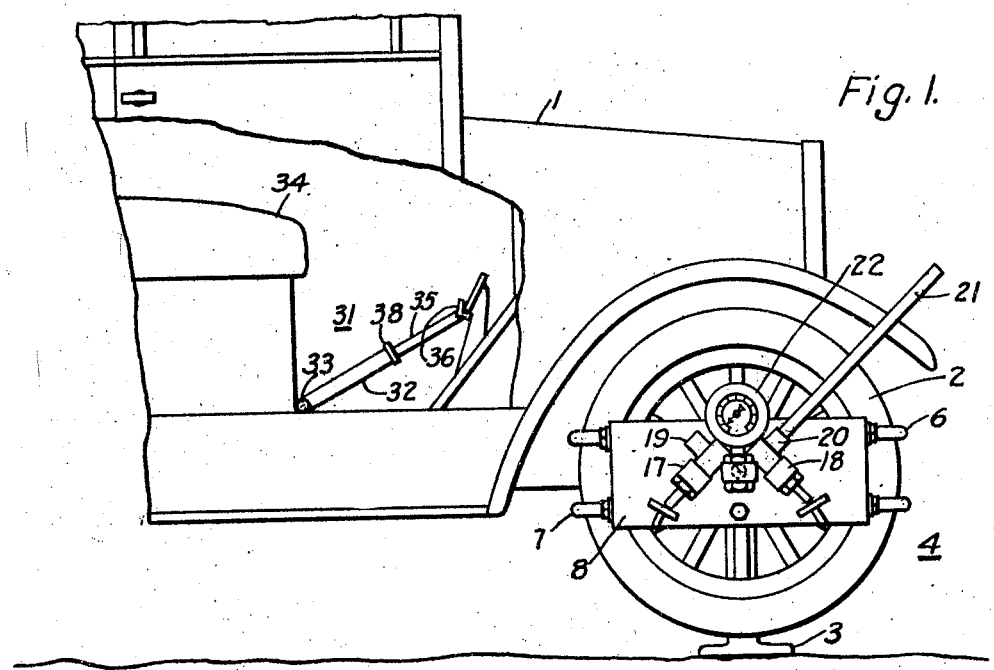

Referring to the drawings, the structure shown in Fig. 1 comprises an automobile 1 having the usual front wheels 2, the axle of which is supported by a suitable jack 3 in order that the wheels do not make contact with the ground, my brake-testing apparatus 4 being shown as applied to one of the front wheels 2.

Figure 2:
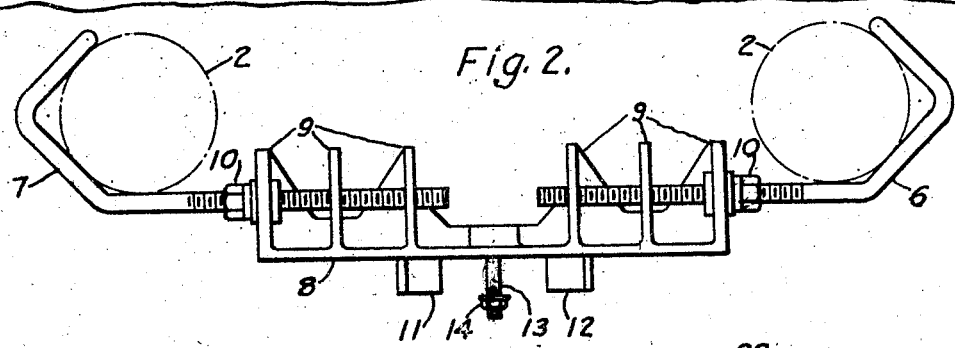
Fig. 2 is a plan view of a portion of the brake testing apparatus that is shown in Fig. 1.

The apparatus 4 comprises a plurality of hook or tire-engaging members 6 and 7, which respectively are formed as loops and bent to engage the periphery or tire of the wheel 2, as clearly shown in both Fig. 1 and Fig. 2. These bent or hook members are adjustably attached to a base or body structure 8 by means of ribs or webs 9 near each end of the base structure, through which the threaded free ends of the hook members 6 and 7 are disposed, being held in adjusted position by means of suitable nuts 10, for example.

The front side of the base structure 8 is provided near its lower edge with a plurality of angularly related projections or lugs 11 and 12, for a purpose to be hereinafter set forth. The central lower portion of the base structure 8 is also provided with a short shaft 13, having a threaded end upon which a nut 14 runs, for a purpose to be hereinafter more fully set forth.

Figure 3:
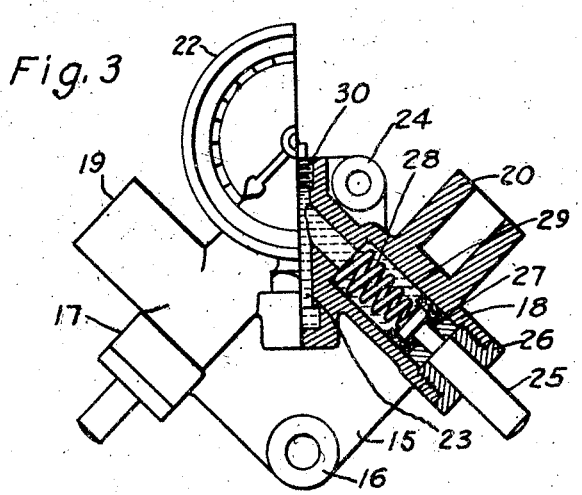
Fig. 3 is a view, partially in front elevation and partially in section, of another portion of the apparatus illustrated in Fig. 1.
Figure 4:
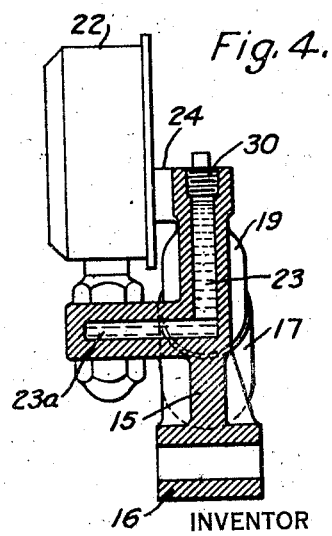
Fig. 4 is a view, partially in side elevation and partially in section, of the apparatus shown in Fig. 3.

The indicating device or portion of my apparatus is shown in Fig. 3 and Fig. 4 as comprising a body or plate member 15, the lower corner of which constitutes a bearing or journal 16 that is adapted to loosely or oscillatably fit upon the shaft 13. The device further comprises a plurality of angularly related cylinders 17 and 18 that are cast en bloc, together with a corresponding pair of sockets 19 and 20 which project from the outer sides of the respective cylinders 17 and 18 for the purpose of receiving the pressure-applying member or handle 21 that is shown in Fig. 1.

A suitable dial or meter device 22, operating on the Bourdon gauge or other pressure principle, is secured to the central portion of the indicating device in communication with each of the cylinders 17 and 18. Each cylinder has associated therewith a suitable plunger or movable portion 25 that is inserted through a suitable nut or screw 26, the plunger terminating in a head that is suitably secured to a cup or piston 27 of leather or the like. A suitable spring 28 is disposed to operate between the inner end of each cylinder and the head of the plunger 25, thereby biasing the latter to its illustrated outermost position. The cylinders 17 and 18 and the vertical passage 23 and horizontal passage 23a communicating therewith are filled to a suitable level with oil or some other fluid, as indicated at 29. The dial device 22 communicates with the passage 23a and is braced from the rear by suitable pads 24 on the upper edge of body member 15.

It will be understood that, when pressure is applied to either of the plungers 25 against the action of the corresponding spring 28, the fluid 29 is compressed or forced inwardly into the meter or dial device 22, which thereupon registers the force applied to the plunger in question.

As clearly shown in Fig. 1, the indicating device of Fig. 3 is mounted upon the shaft 13 of the base structure 8 in such manner that the individual plungers 25 rest upon the respective lugs or projections 11 and 12 of the base.

When it is desired to test the brakes of an automobile, for example, the apparatus is assembled as shown in Fig. 1, and clamped or hooked upon the wheel or tire, as illustrated, the threaded ends of the hook members 6 and 7 and the nuts 10 being utilized to suitably adjust the apparatus in accordance with the diameter of the tire.

A suitable brake-pedal depressor is then utilized, in order that the same position of the brake-pedal may be utilized in connection with all wheels to be tested. This pedal depressor may take the form shown in Fig. 1, as indicated by the reference character 31. Specifically, the device comprises a hollow member 32 having a half-round head or pad 33 welded on one end thereof and a threaded rod 35 having a bifurcated end 36 and adapted to be adjusted longitudinally with respect to the tube 32 by means of a knurled and threaded nut 38. As shown, the bifurcated end 36 is placed upon the brake pedal 37 of the automobile and the head or pad 33 at the opposite end is disposed against the lower edge of the foot-board of the seat 34. By suitable adjustment of the knurled nut 38, any desired pressure may be placed upon the brake pedal 37.

To test the brake on the illustrated right front wheel 2, the handle or lever 21 is then placed in the corresponding socket 20 and the handle is depressed until the brake just slips or, in other words, until the brake drum just turns within the brake band. It will be noted that pressure is applied to turn the brake drum only through the small cylinder 18 of my brake-testing apparatus, the corresponding plunger 25 and the projection or lug 12 of the base structure 8. Consequently, the resultant inward movement of the plunger 25 causes an indication to be given by the dial device 22, and the indication on the dial at the moment of such brake slipping designates the force required to slip the brake in the corresponding direction, namely, clockwise, as viewed in Fig. 1.

To ascertain the force required to slip the brake in the other direction, the handle 21 is placed in the opposite socket 19 and depressed. In a similar way, the resultant inward movement of the corresponding plunger 25, acting through the cylinder 17, again indicates on the dial device 22 the force in question. If desired, the wheel may be turned through a complete revolution and a reading taken during such movement.

The best method of equalizing the automobile brakes, particularly when the car is equipped with four-wheel brakes, is to jack up the wheels and then place the illustrated pedal depressor in the position shown, in order that the same setting of the brake pedal may be utilized in connection with the tests on all four wheels. Each brake should then be tested in the manner described above to determine which wheel has the most braking pressure applied, or, in other words, which brake requires the moist force to slip it. In some cases, this particular wheel may, of course, be determined by hand operation before applying my brake-testing apparatus.

After obtaining the reading on the wheel having the greatest braking pressure, readings should be taken on all of the other wheels in a similar way, and the individual brakes adjusted to provide a braking force corresponding to that obtaining on the wheel having the largest initial braking force. Of course, if desired, all four brakes may be adjusted to provide any other braking force, and accuracy will be insured by adjusting the braking forces to effect equal indications on my brake-testing apparatus.

It will be seen that I have thus provided a simple wheel-brake-testing apparatus which is relatively light in weight and, therefore, readily portable, which may be quickly applied to wheels of any diameter, and which will readily and quickly indicate the braking force required to slip the brake in either direction.

I do not wish to be restricted to the specific structural details or arrangement of parts herein set forth, as various modifications thereof may be made without departing from the spirit and scope of my invention. I desire therefore, that only such limitations shall be imposed as are indicated in the appended claims.

I claim as my invention:

1. Wheel-brake-testing apparatus comprising a structure adapted to peripherally engage a wheel, an indicating device loosely mounted on said structure, and means for effecting engagement of different portions of said structure by said device to indicate the respective forces required to slip the brake in the one or the other direction when set.

2. Wheel-brake-testing apparatus comprising a structure adapted to adjustably engage the periphery of a wheel, an indicating device operatively mounted on said structure and having a plurality of plunger members, and means for effecting mutually exclusive operation of said members by different portions of said structure.

3. Wheel-brake-testing apparatus comprising a base member having a projection, a plurality of wheel-periphery-gripping members secured to said base member, an indicating device loosely mounted on said base member and having a movable portion, and means for effecting movable engagement of said portion and said projection.

4. Wheel-brake-testing apparatus comprising a base member having a plurality of projections, a plurality of wheel-periphery-gripping members secured to said base member, and an indicating device loosely mounted on said base member and having a plurality of movable portions for operation by the respective projections upon operating said device in the one or the other direction relative to said base member.

5. Wheel-brake-testing apparatus comprising a base member having a lateral projection, a plurality of wheel-periphery-gripping members adjustably attached to said base member, an indicating device oscillatably mounted on said base member and having a movable portion, and means for effecting movable engagement of said portion and said projection.

6. Wheel-brake-testing apparatus comprising a base member having a plurality of lateral projections, a plurality of wheel-periphery-gripping members adjustably attached to said base member, and an indicating device oscillatably mounted on said base member and having a plurality of movable portions for operation by the respective projections upon turning said device in the one or the other direction relative to said base member.

7. Wheel-brake-testing apparatus comprising a base member having a projection and a shaft, a plurality of wheel-periphery-gripping members secured to said base member, an indicating device loosely mounted on said shaft and having a plunger, and means for effecting movable engagement of said plunger and said projection.

8. Wheel-brake-testing apparatus comprising a base member having a plurality of projections and a shaft, a plurality of wheel-periphery-gripping members secured to said base member, and an indicating device loosely mounted on said shaft and having a plurality of plungers for operation by the respective projections upon turning the said device in the one or the other direction relative to said base member.

9. Wheel-brake-testing apparatus comprising a base member having a plurality of angularly-related lateral projections and a shaft, a plurality of wheel-periphery-gripping members adjustably attached to said base member, an indicating device loosely mounted on said shaft and having a plurality of oppositely disposed plungers, and means for effecting mutually exclusive operation by said projections of said plungers.

10. Brake-testing apparatus comprising an indicating device having a plurality of movable pressure members, a pressure-applying member, there being plural means on said indicating device for respectively receiving said pressure-applying member, and means adapted to be secured to the wheel to be turned in the one or the other direction and pivotally associated with said indicating device for exerting pressure against the one or the other movable pressure members when said pressure-applying member is actuated in the one or the other direction.

11. Wheel-brake-testing apparatus comprising an indicating device having a plunger and also a socket, a handle member applicable to said socket, and means secured to the wheel periphery and pivotally associated with said indicating device for exerting pressure against said plunger when said handle member is actuated.

12. Wheel-brake-testing apparatus comprising an indicating device having a plurality of oppositely disposed plungers and also a plurality of oppositely disposed sockets, a handle member applicable to the respective sockets, and a base member pivotally associated with said indicating device and having a plurality of projections for exerting pressure against the one or the other plunger when said handle member is actuated in the one or the other direction.

13. Wheel-brake-testing apparatus comprising an indicating device having a plurality of angularly related plungers and also a plurality of corresponding sockets, a handle member applicable to the respective sockets, and a base member pivotally associated with said indicating device and adjustably attached to the wheel periphery and having a plurality of angularly related lateral projections for exerting pressure against the one or the other plunger when said handle is disposed in the one or the other socket and depressed.

In testimony whereof, I have hereunto subscribed my name this 15th day of August, 1928.

GEORGE F. SCHODDE.